April 12, 1960

O. C. HANSEN 2,932,192

FLUID OPERATED MACHINE TOOL

Filed March 5, 1957

INVENTOR
Oscar C. Hansen

Kotts & Sheridan
ATTORNEYS

United States Patent Office 2,932,192
Patented Apr. 12, 1960

2,932,192

FLUID OPERATED MACHINE TOOL

Oscar C. Hansen, Detroit, Mich.

Application March 5, 1957, Serial No. 644,025

9 Claims. (Cl. 77—33.5)

The present invention relates to an improved fluid operated mechanical hydraulic control type power transmission for use with machine tools. This invention is primarily concerned with automatic machine tool operations, such as deep hole drilling. Although many successful attempts have been made to drill deep holes in various machine parts, the cost and complexity of the means required are prohibitive and considerable design difficulty has been experienced in both the mechanical and electrical controls required to produce a satisfactory automatic cycle.

Therefore, one of the principal objects of the present invention is the provision of a machine tool which is simple in design, economical to operate and compact in structure, wherein a satisfactory automatic cycle permits said machine tool to be rapidly advanced and rapidly retracted repeatedly from the workpiece during the cutting operation, while maintaining a constant feed rate during the work cycle.

Another object of the present invention is in the provision of a machine tool which is remotely controlled with a minimum number of electrical and mechanical components, providing increased efficiency with reduced down time. This machine tool is provided with an electric solenoid for the initiation of the cycle by remote control and a second solenoid for interrupting the cycle at any time during the cycle, with adjustable hydraulic and mechanical controls to automatically control the cycle of operation.

Another object of the present invention is the provision of a machine tool having a driven spindle located concentrically on the center line of the work cylinder piston rod, thus minimizing the probability of misalignment of the spindle with respect to the workpiece, which is a common fault in off-center design devices, due to the deflection of their component parts.

Another object of the present invention is the provision of a conventional type vane type pump which provides high volume, low pressure fluid for use during the rapid traverse forward and rapid return functions, with a second stage which provides low volume high pressure fluid for use during the forward constant feed portion of the cycle. A pump having the aforesaid characteristics eliminates excessive power consumption and the necessity of discharging a large volume of high pressure fluid during the work cycle. A further advantage being that the moving fluid in the system is not excessively heated, thus only a minimum amount of fluid reservoir capacity is required, because of the increased thermal efficiency.

Another important feature of the present invention is the provision of an automatic mechanical-hydraulic operated valving control system. As the work cycle is started, the rotating driven spindle, which is telescopically housed in the work cylinder piston rod, moves toward the workpiece at a rapid traverse rate, with the controlled feed rate starting a very short distance from the workpiece. As the driven spindle advances at a predetermined rate of feed, said driven spindle automatically retracts for chip removal and cooling and again goes through a similar step, moving rapidly forward to a point just short of the workpiece, then forward at the controlled rate of feed, retracting automatically after each successive step. After several of these cycles have occurred and the desired depth of hole has been reached, the machine tool automatically retracts and returns to the starting position ready for another complete cycle.

Another feature of the present invention is in the use of frictional contact sliding piston rod bushing, working on the outside diameter of the work cylinder piston rod, providing a bushing type valve construction which partially controls the motion and cycling of the work cylinder piston and driven spindle.

It has been found that the foregoing and related objects can be accomplished by the provision of a fluid operated mechanical hydraulic machine tool, comprising a driving means, a fluid pump, operated by said driving means; a manifold housing said fluid pump; a work cylinder having a fluid actuated piston disposed within said cylinder, said piston having a piston rod thereon; a piston rod bushing member in frictional contact and slidably mounted on said piston rod; a driving spindle slidably mounted within said piston rod and adapted to have a tool holder affixed thereto, said spindle being rotated by said driving means; a cam actuated pilot valve mechanism for controlling the system's program; a timer valve for controlling the time cycle; a cycle valve for controlling the system's cycle of operation, said control valves being housed within said manifold; a program cam mounted within said manifold to operate said pilot valve mechanism, which pivot valve mechanism controls said timer valve and said cycle valve for determining the cycle of said piston; and mechanical means for limiting the travel of said piston.

Other features of the present invention will appear in the following description and appended claims, reference being had to the accompanying drawings which form a part of this specification, wherein like characters designate corresponding parts in the several views.

Before explaining the present invention in detail it is to be understood that the invention is not limited in its application to the details of construtcion and arrangement of parts illustrated in the accompanying drawings, since the invention is capable of other embodiments and of being practiced and carried out in various ways. It is also to be understood that the phraseology and terminology employed herein is for the purpose of description and not of limitation.

Figure 1:
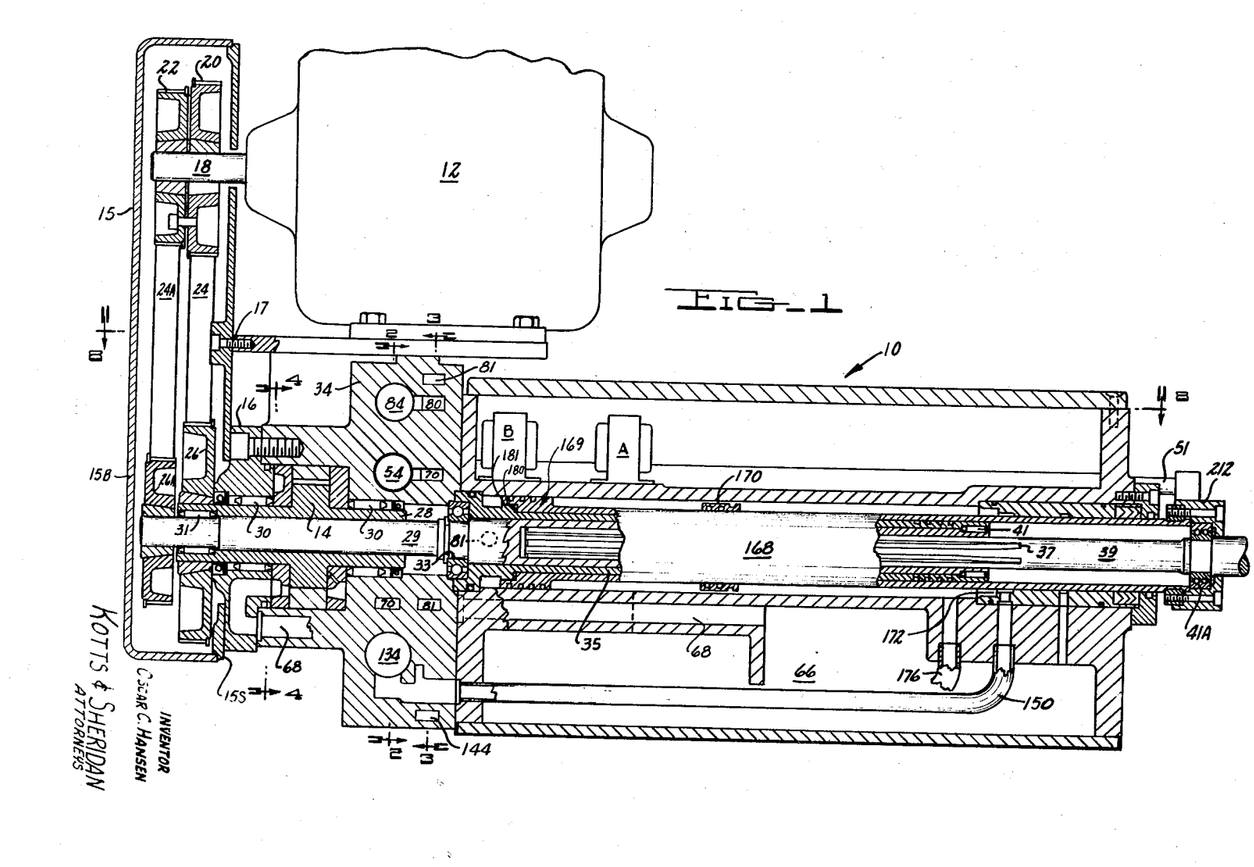
Fig. 1 is a cross-sectional view of my mechanical hydraulic machine tool assembly.

Referring to the drawings:

Fig. 1 illustrates the cross-sectional view of a mechanical hydraulic machine tool assembly 10, embodying my invention. An electric motor 12 is provided to drive a two stage fluid pump 14 which supplies fluid pressure for the system's operation. The electric motor 12 has keyed to its driving shaft 18, two pulleys 20 and 22. One pulley 20 on the driving shaft 18, drives the timing belt 24, which in turn drives the second pulley 26 keyed to a fluid pump shaft 28.

The pump shaft 28 is journalled in two needle bearings 30 which are pressed into the manifold end cover plate 16 and the manifold housing 34, to provide proper alignment of the pump rotor 14. The driving pulley 22, keyed to the electric motor shaft 18, drives a timing belt 24A and pulley 26A, which is keyed to the central drive shaft 29. The central drive shaft 29 is supported on its left end by a needle bearing 31 mounted in a bore on the left end of the pump shaft 28, the mid-section of drive shaft 29 being supported by a ball bearing 33, partially housed in the manifold housing 34, while the extreme right end of the drive shaft 29 is rotatably supported by a needle bearing 41, mounted in the right end of the cylindrical sleeve member 35.

The driven spindle member 39 engages a female spline 37 on the drive shaft 29 and is rotatably supported on the right end by a double row ball bearing 41A, housed in the spindle bearing cover 212. A chuck (not shown) is secured to the extreme right end of the driven spindle 39, to which the necessary drills or tools are affixed. A control rod 51 is rotatably secured to an ear on the spindle bearing cover 212. The control rod 51 extends rearward through the machine housing and is surrounded by a slotted program shaft 48. A program cam 50 is mounted thereon. Secured to the end of control shaft 51 is a flipper member 198. This flipper member 198 extends through a slot 43 in the program shaft 48. Movement or extension of the shaft which carries the spindle bearing cover 212 causes control rod 51 to move at the same rate and in the same direction. Engagement of the flipper member 198 with cams 200, 202 and 204 mounted on the machine housing causes rotation of the program shaft 48 to thereby control the program cam 50.

The driving pulleys 20 and 22, the driven pulleys 26 and 26A and the timing belts 24 and 24A are housed in a case 15, comprised of a belt guard 15B and a belt guard support 15S which is secured to the manifold end cover plate 16 by metal screws 17.

To best understand the operation of my mechanical hydraulic machine tool, I believe a brief description of the manifold 34 and the component parts, namely, the pilot valve program cam 50, the pilot valve mechanism 53, the timer valve 84 and the cycle valve 134, would help simplify the description that follows (see Fig. 2):

In the interest of simplicity, oil seals, O-rings, and other such parts of standard function have been disregarded in the following description, although most of these parts are shown in the drawings.

Figure 8:
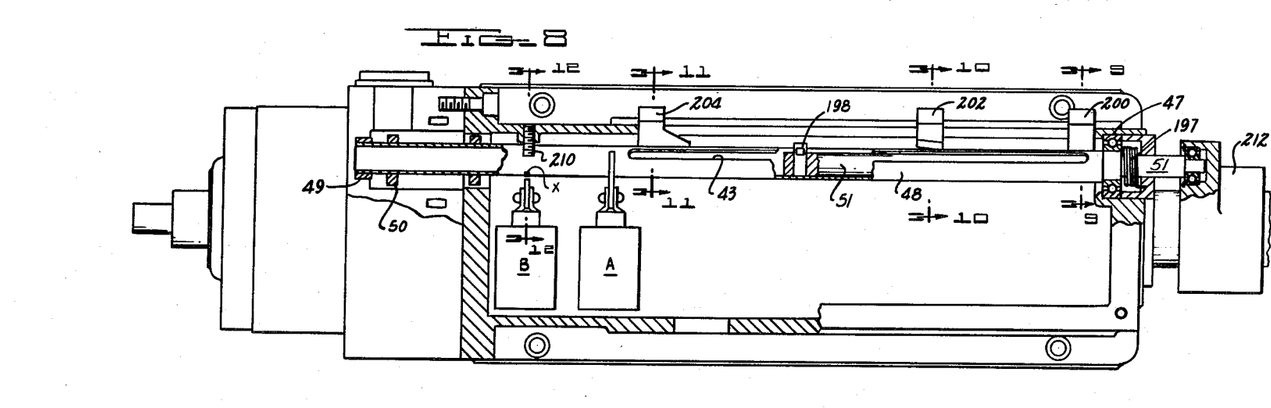
Fig. 8 is a top view partially cross-sectioned taken substantially along line 8—8 of Fig. 1, with parts broken away.
Figure 9:
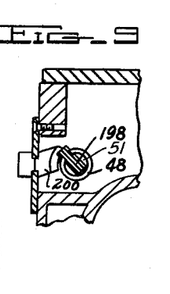
Fig. 9 is a cross-sectional view taken along line 9—9 of Fig. 8.
Figure 10:
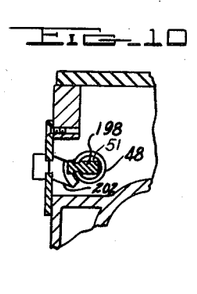
Fig. 10 is a cross-sectional view taken along line 10—10 of Fig. 8.

The pilot valve program cam 50 mounted on the program shaft 48 is journalled on the right end, in a ball bearing 47 and in a sleeve bearing 49 on the left end (Fig. 8). When the program cam 50 is rotated, it operates a cam follower 52 on the left end of a three piece pilot valve structure 53. A program piston 54, is located in the central portion of the three piece pilot valve structure 53, supported on the left end in a bore 42 in the program bushing 55, while the right end of the program piston 54 is carried in a bore 44 within a regulator member 56. Both the program bushing 55 and the regulator member 56 work within a bore 57 in the manifold 34.

Figure 2:
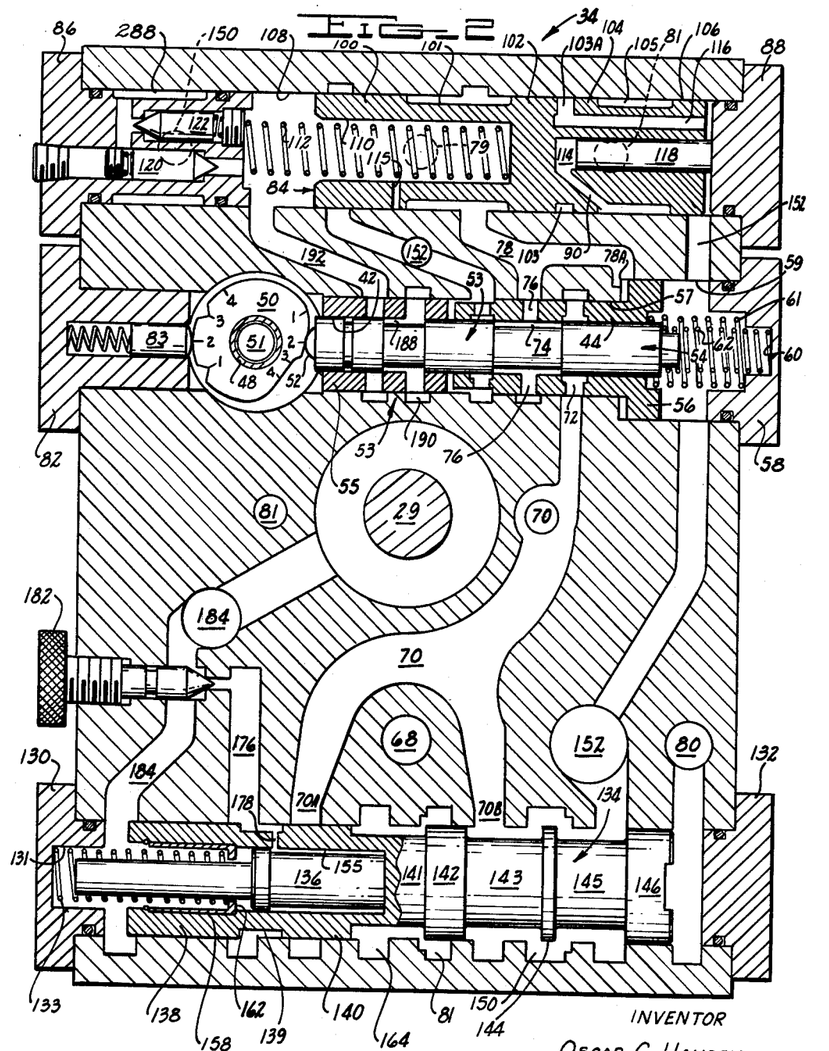
Fig. 2 is an enlarged cross-sectional view through the manifold, taken substantially along line 2—2 of Fig. 1.

A regulator end cover member 58 is provided on the right end of the program piston 54, in the manifold counterbore 59, to limit the movement of the regulator member 56 against compression spring 61. A double counterbore 60 is provided in the regulator end cover 58 to provide a spring seat for spring members 61 and 62, which maintains the pilot valve cam follower 52 in constant contact with the pilot valve program cam 50. An end cover 82, located on the left end of the three piece pilot valve structure 53, has mounted therein, a spring loaded detent pin 83 which engages the pilot valve program cam 50. The detent pin 83 engages the cam surface of the pilot valve program cam 50 in either of several positions, and securely holds the pilot valve program cam 50 in the proper position.

The timer valve piston 84, located above the three piece pilot valve structure 53, in the manifold housing 34, is contained between two end covers 86 and 88. The timer piston 84, has on its outer diameter four lands 100, 102, 104 and 106 and three undercut portions or chambers 101, 103 and 105 and works within a bore 108 of the manifold housing 34. The central portion of the timer piston 84 has a bore 110 therein, to receive a compression positioning spring 112 in its left end. A radial exhaust opening 115 is provided in the timer piston 84 and intersects said central bore 110. The right end of the timer piston 84 is provided with two openings 114 and 116, the first opening 114 is centrally located and has therein a movable plug member 118, while the second opening 116 is a fluid exhaust passage, which intersects the undercut chamber 103 through a drilled passage 103A. End cover 86, located on the left end of the timer valve 84 has mounted therein, an adjustable spring loaded metering valve 120 and a spring loaded check valve 122. The end cover 86 also provides a spring seat and stop member to limit movement of the timer valve 84 to the left against compression positioning spring 112.

A two piece cycle valve piston 134, located below the pilot valve mechanism 53, is contained between end covers 130 and 132. The cycle valve piston 134 has five lands 138, 140, 142, 144 and 146 on the outside diameter. Between the lands are four undercut portions 139, 141, 143 and 145. The end cover 130 has therein a recess 131, to receive one end of a compression positioning spring 133 while the left end of the cycle valve piston 134 has therein a bore 155. A radial passage 178 is provided in the left end of the cycle piston 134 which intersects the undercut chamber 139 and the bore 155. A balance piston 136 is positioned in the bore 155, followed by sleeve member 158, mounted in counterbore 156, and held in position by a snap ring 160. A flange 162, on the sleeve member 158, provides a spring seat for compression spring 133 on the left side, while the right side of the flange member 162 provides a stop which limits the movement of the balance piston 136.

Figure 6:
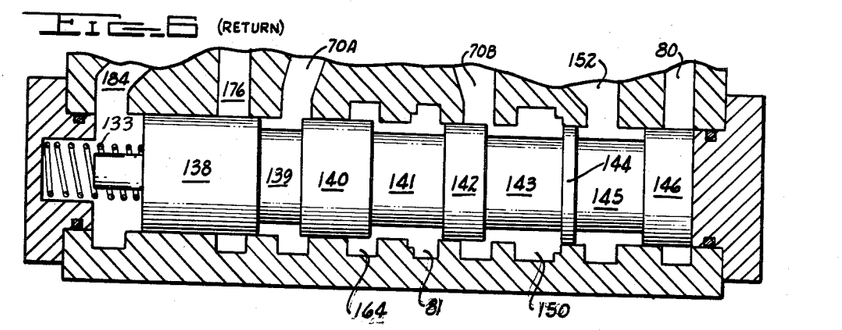
Fig. 6 is a partial cross-sectional view similar to Fig. 5 showing the return position of the cycle valve.
Figure 7:
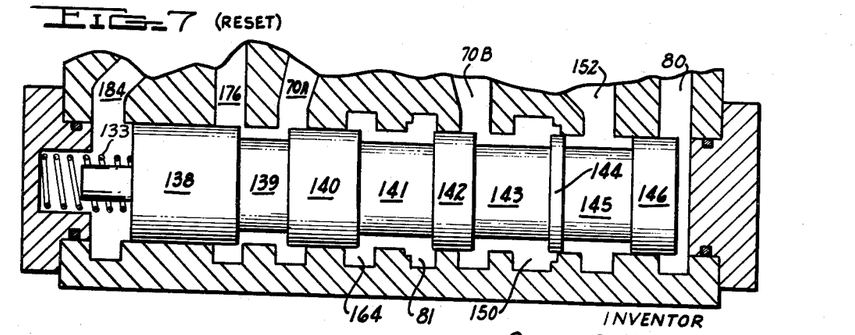
Fig. 7 is a partial cross-sectional view similar to Fig. 5 showing the lower part of the manifold with the cycle valve in the reset position.
Figure 11:
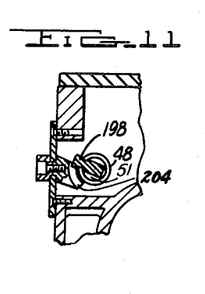
Fig. 11 is a cross-sectional view taken along line 11—11 of Fig. 8.
Figure 12:
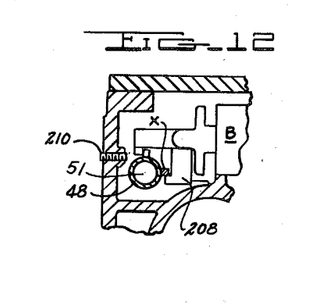
Fig. 12 is a partial cross-section on line 12—12 of Fig. 8 showing the adjustable latch construction.

With the mechanical controls shown in Fig. 8 in the position illustrated in Fig. 11 and the control valves positioned as shown in Fig. 2, this basic function occurs. With the electric motor 12 rotating the pulleys, belts, pump and spindle, all of the hydraulic fluid, moving through the system, is ported to the reservoir (unload position). When solenoid A is energized, the pilot valve program cam 50 is rotated, positioning the program piston 54, which in turn activates the timer valve piston 84 and positions the cycle valve piston 134. As this occurs, high volume low pressure fluid is ported to the back of the work cylinder piston 169, moving the work cylinder piston forward rapidly. Port 150, at the forward end of the work cylinder, is open to exhaust until such time as the piston rod bushing 170 engages the head of the work cylinder 172, restricting passage 150. This restriction in passage 150 causes the cycle valve piston 134 to assume the forward feed position, and the trapped fluid in front of the work cylinder piston 169 exerts a back pressure limiting the forward motion of the work cylinder, since any fluid escaping must pass through passage 176 and exhaust through the adjustable feed screw needle valve 182. During the time the work cylinder has been moving forward, the timer piston 84 has been moving to the left and upon reaching its maximum movement to the left, fluid pressure is reduced at the right end of the cycle valve 134, causing it to assume the return position (Fig. 6). In this position the low volume high pressure fluid in back of the work cylinder and timer is ported to exhaust, which permits the timer valve to move to the right, with the help of the compression positioning spring 112. When the timer valve piston 84 reaches its maximum travel to the right, a successive cycle takes place. Having gone through several of these forward and return cycles, and reached the desired depth of hole, a spring loaded flipper member 198 carried on rod 51, comes into action. Flipper member 198 which extends through a longitudinal slot 43, in the program shaft 48, strikes the adjustable dog member 200, which repositions the pilot valve program cam 50 to reset position 4 (Fig. 7). In the reset position, hydraulic fluid enters the front of the work cylinder through passage 176 between the head of the work cylinder 169 and piston rod bushing 170, while fluid is exhausting through the back of the work cylinder through passage 164 in the manifold. This causes the work cylinder to retract maintaining the piston rod bushing 170 in its forward position. When the flipper member 198 strikes the second adjustable dog 202, the pilot valve program cam 50 is again repositioned to permit the cycle valve to assume the return position, thus permitting hydraulic fluid to enter passage 150 which repositions the piston rod bushing 170 on the work cylinder piston rod 168 causing the work cylinder to retract rapidly. When the work cylinder piston moves to the extreme left, the flipper member 198 strikes the third dog 204, and again repositioning the pilot valve program cam 50 to position No. 2 which unloads the system, and ports to exhaust all of the low volume high pressure fluid and the high volume low pressure fluid.

Figure 3:
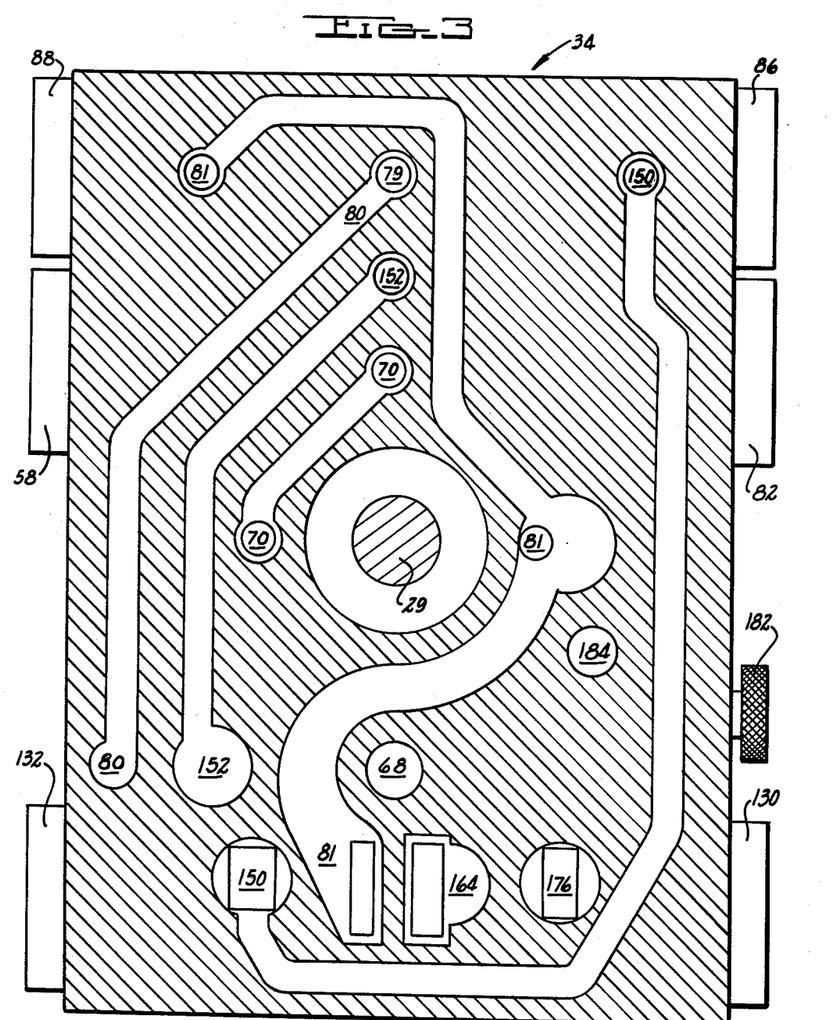
Fig. 3 is an enlarged view taken along line 3—3 of Fig. 1.
Figure 4:
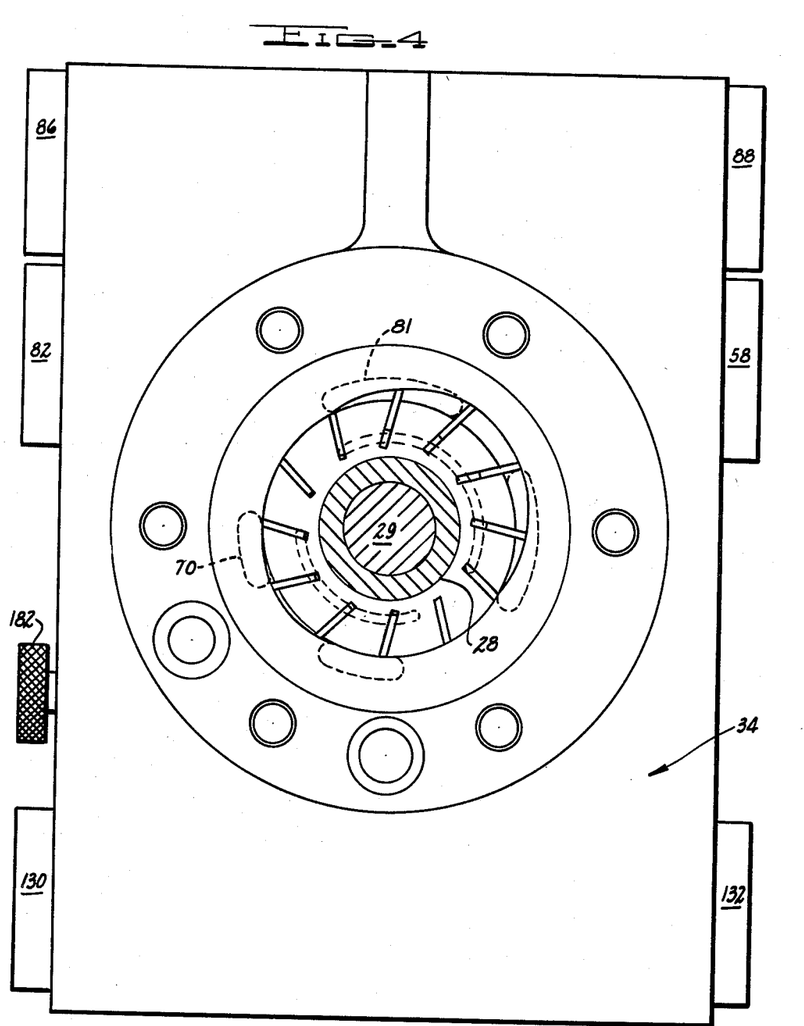
Fig. 4 is an end view of Fig. 1 with the belts, pulleys and manifold end cap removed.
Figure 5:
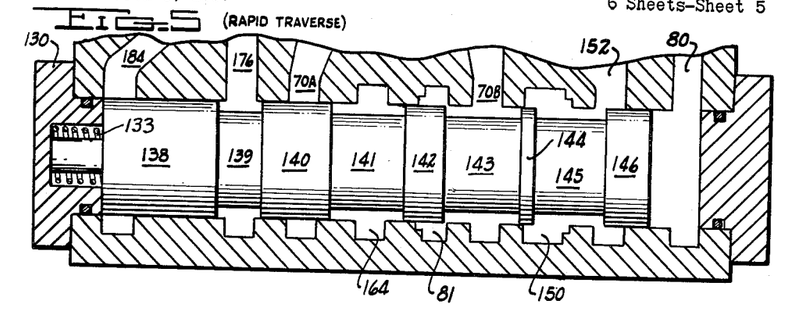
Fig. 5 is a partial cross-sectional view of the lower part of the manifold showing the forward rapid traverse position of the cycle valve.

To initiate the work cycle it is necessary to start the electric motor 12 and energize solenoid A by remote control. Solenoid A rotates the pilot valve program cam 50 to position number 1 moving the pilot valve program piston 54 to the right against compression spring 62, seated in the regulator cover 58. Movement of the program piston 54, permits high volume low pressure fluid to move upward through passage 70 in the manifold, through the radial holes 72 in the regulator member 56 and into the undercut chamber 74 of the program piston 54. Fluid continues through a second series of radial holes 76 in the regular member 56 into passage 78 in the manifold and then into the undercut chamber 101 of the timer valve piston 84. Fluid moving through passage 78A moves the regulator member 56 to the right against compression spring 61, seated in the regulator cover 58. Movement of the regulator member 56 to the right limits the flow of fluid through passage 72 into the timer valve 84 through the undercut chamber 74 and passage 76 and 78. Fluid moving around and through the undercut chamber 101 in the timer valve piston 84, moves through the dotted opening 79 in the manifold (Fig. 2) and through opening 80 (Fig. 3) to the right end of the cycle valve piston 134, moving said cycle valve piston 134, to the limit of its travel to the left stopping against end cover 130. This will be known as the rapid traverse forward piston (Fig. 5). With the cycle valve piston 134 in the rapid traverse forward position, high volume low pressure fluid from the pump 14 moves through opening 70 in the manifold, passage 70A is blocked by land 140 on the cycle valve piston 134, while opening 70B is open to the back of the work cylinder piston 169 through opening 81, in communication with the pump 14 which supplies high volume low pressure fluid for the system's operation. The cycle valve piston 134 will remain in the forward rapid traverse position until such time as the piston rod bushing 170 (Fig. 1), which is slidably mounted on the work cylinder piston rod 168, engages the annular opening 172 on the head of the work cylinder. As this occurs the piston rod bushing 170 acts as a valve piston, closing the exhaust opening 150, trapping the hydraulic fluid left between the work cylinder piston 169 and the piston rod bushing 170. The trapped fluid moves through passage 176 and is metered through an adjustable metering feed device 182 to exhaust, through port 184. Some of the trapped fluid moves around the undercut chamber 139 in the cycle valve piston 134 and through opening 178, moving the balance piston 136 to the extreme left against the sleeve member flange 162, thus causing the cycle valve piston 134 to move to the right until a balanced fluid pressure exists between the right and left ends of the cycle valve piston 134. When this position is reached, the work cylinder piston moves forward at the feed rate. With the cycle valve piston 134 in the forward feed position all of the high volume low pressure fluid is ported through opening 70B (Fig. 2), around undercut chamber 143, through opening 150, around the undercut chamber 145 and to exhaust through port 152 in the manifold. The trapped fluid which is being metered through the metering device 182 permits the work cylinder 169 to move forward at a metered feed rate. Should it be desirable to increase or decrease the feed rate, it is only necessary to advance or retract the adjustable feed screw device 182 to admit or restrict hydraulic fluid to the exhaust passage 184. During the entire feed portion of the work cycle, all of the hydraulic fluid is supplied by the low volume, high pressure pump, since the high volume low pressure pump is ported to exhaust through port 152.

Should the work tool encounter material of unequal hardness, which would require additional fluid pressure to move the tool forward, additional fluid pressure is made available by the automatic repositioning of the cycle valve. As the tool encounters harder material, a drop in pressure occurs between the head of the work cylinder 168 and the piston rod bushing 170. This causes a drop in pressure in the balance piston 136 which permits the cycle valve to automatically move to the left until a balance of fluid pressure exists between both ends of the cycle valve piston 134. As the cycle valve 134 moves to the left, high pressure fluid from pump passage 81 which had been exhausting through passage 164, is now closed, thus increasing the volume of high pressure fluid going to the back of the work cylinder piston 169.

During this time, low volume high pressure fluid through passage 81 has been introduced into the undercut chamber 105 in the timer valve piston 84, in communication with passage 90 which permits fluid to enter chamber 114. Fluid pressure in chamber 114, acts against the left end of the slidable plug member 118 and causes the timer valve piston 84 to move to the left against compression spring 112 and the hydraulic pressure in bore 108, between timer valve piston 84 and end cover 86. As the timer valve 84 moves to the left, passage 78 is closed, the radial opening 115 in the timer valve 84 is opened to exhaust through opening 152 in the manifold, thus, relieving the fluid pressure trapped between the timer valve piston 84 and the end cover 86 to zero, permitting the cycle valve 134, with the help of the compression spring 133, to move to the extreme right hand position known as the return position (Fig. 6). When the timer piston 84 moves to the left, and before passage 78 is closed, the trapped fluid in bore 108 is metered through the spring loaded metering valve 120, in communication with the undercut chamber 288 in the timer valve cover 86. Fluid then moves around the undercut chamber 288, through dotted passage 150 and is ported through the cycle valve undercut chamber 145 to exhaust through passage 152. As the cycle valve 134 reaches the return position, opening 81 in communication with the back of the work cylinder 169 is open around the undercut chamber 141, exhausting through passage 164.

As the cycle valve piston 134 moved to the right, out of the forward feed position, a momentary opening of the high volume low pressure fluid through passage 70A, into passage 176 occurred. This momentary opening caused the work cylinder piston 169 to move rearwardly, while the piston rod bushing 170 was held in its initial position.

When the cycle valve piston 134 strikes the end cover 132, high volume low pressure fluid moves through opening 70B and around the undercut chamber 143 and around the cycle valve piston 134 to the front of the piston rod bushing 170, through passage 150, moving the bushing member away from the head of the work cylinder 172, permitting the work cylinder piston 169 to return rapidly with the piston rod bushing 170 in a new position. During this time, chamber 114 in the right hand end of the timer valve piston 84 has been open to exhaust through passage 81 and 164. When work cylinder piston 169 reaches extreme left position (Fig. 1) engaging the flange member 181 of work cylinder piston 169 a cup-shaped cushion chamber 180, in the end of the piston causes a pressure increase in passage 150 through port 288, and spring loaded check valve 122, moves timer valve piston 84, rapidly to the extreme right position (Fig. 2). Hydraulic fluid is then ported through passage 70 in the manifold, through the radial hole 72 in the regulator member 56 and into the undercut chamber 74 of the program piston 54. Fluid continues through the second series of radial hole 76 in the regulator member 56, into passage 78 in the manifold and into the undercut chamber 101 of the timer valve piston 84, as previously described. Again the work cylinder piston 169 advances rapidly until the piston rod bushing 170 engages the head of the work cylinder 172, which blocks the exhaust opening 150, causing the cycle valve to again assume the forward feed position, with the work spindle 39 somewhat short of its previous forward position, due to the repositioning of the piston rod bushing 170. Each time the timer piston 84, "times out," the above cycle is repeated.

When the desired depth of hole has been reached, the spring loaded flipper member 198 strikes an adjustable dog member 200, which repositions the pilot valve program cam 50 to position 4. With the pilot valve program cam 50 in position 4, the cycle valve 134 moves to the right and assumes the reset position (Fig. 7). The cycle valve 134 then exhausts the back of the work cylinder 169 through passage 81 in communication with passage 164, while admitting low pressure high volume fluid to the front of the work cylinder between the piston rod bushing 170 and the work cylinder piston 169, maintaining the piston rod bushing 170 in the forward position. As the work cylinder piston 169 retracts, the flipper member 198 strikes a second adjustable dog member 202, which repositions the pilot valve program cam 50, to position 3, while the regulator member 56 positions the cycle valve 134 in the return position (Fig. 6). In this position, high volume low pressure fluid moves through opening 70B around the undercut chamber 143 in the cycle valve piston 134 to the front of the piston rod bushing 170, moving the piston rod bushing 170, out of engagement with the head of the work cylinder 172, permitting the high volume fluid in the system to return to the work cylinder piston 169 rapidly.

As the work cylinder 169 retracts still further, the flipper member 198 strikes a third dog member 204, which again positions the pilot valve program cam 50 in position 2. With the cycle valve piston 134 is the unload position (Fig. 2), passage 70A is blocked by land 140, while the opening 70B is open around the undercut chamber 143 through opening 150 around undercut 145, and to exhaust through passage 152. Low volume high pressure fluid is ported through opening 81, around the undercut chamber 141 and to exhaust through passage 164, thereby completing the cycle.

The program shaft 48 (Fig. 8) is adjustable in position 4 of the pilot valve program cam 50 by adjusting screw 210 against lug (x). Movement of the screw 210 in one direction permits additional throw, while turning the screw in the other direction reduces the throw of the pilot valve program cam 50 in position 4, which repositions pilot valve structure 54, and adjusts the reset position of the cycle valve 134 (Fig. 7).

Should this fluid operated machine tool for any reason be installed in any position other than horizontal, as shown, the pilot valve structure 54 and the adjustable dog 204 will operate to hold the work cylinder in the rest position.

Assume that the machine tool is installed in a vertical position having the spindle up, the weight of the spindle naturally tends to move the work cylinder piston down when this occurs, the cam driver spring 197 maintains the flipper member 198 in contact with the dog face 204. As the flipper member moves up the adjustable dog face 204 the pilot valve program cam 50 is rotated, causing the pilot valve structure to move the cycle valve 134 to the left and close port 81, in turn causing the work cylinder to move out into the desired rest position. Should the unit be installed with the spindle down, the reverse action occurs. The spindle then tends to move the flipper member 198 down the adjustable dog 204, causing a rotation of the pilot valve program cam 50 in the opposite direction, moving the pilot valve structure 54 to the left and the cycle valve 134 to the right, partially closing port 150 to the front of the work cylinder piston 169, moving the work cylinder piston 169 back into the rest position.

From the foregoing description it will be readily apparent to those skilled in the art, that the device herein described is simple in design and operation, compact in structure and automatic in function. The electrical components are of a minimum number and may be operated manually or automatically. The controlled automatic feed device of the present invention may be adjusted to meter a constant volume of fluid from a constant pressure source, to create any desired feed rate, without additional valving, as required in conventional structure and without jeopardizing the thermal efficiency of the hydraulic fluid used. The driven spindle is concentric with and telescopically housed within the work cylinder. This construction prevents any possible misalignment of the work tool due to a deflection of the parts. The valving required for the system's operation is of unitary construction and mechanically and hydraulically controlled. Adjustable mechanical means are provided to limit the forward and reverse travel of the work cylinder, the rate of feed of the work cylinder piston and the work cylinder piston position of rest.

Having thus described my invention, I claim:

1. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact with said piston rod; a driving spindle slidably mounted within said piston rod and adapted to have a work tool affixed thereto; said spindle being rotated by said driving means; valve control means within said manifold; mechanical means for controlling said valve control means for determining the cycle of said piston; and mechanical means for limiting the travel of said piston.

2. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact with said piston shaft; a driving spindle slidably mounted within said piston rod and adapted to have a tool holder affixed thereto, said spindle being rotated by said driving means; a pilot valve mechanism for controlling the system's program; a timer valve for controlling the time cycle of the program; a cycle valve for controlling the system's cycle of operation, said valve controls being housed within said manifold; and mechanical means for operating said pilot valve mechanism, which pilot valve mechanism controls said timer valve and said cycle valve for determining the cycle of said piston; and mechanical means for limiting travel of said piston.

3. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact and slidably mounted on said piston rod; a driving spindle slidably mounted within said piston rod and adapted to have a tool holder affixed thereto, said spindle being rotated by said driving means; a cam actuated pilot valve mechanism for controlling the system's program; a timer valve for controlling the time cycle of the program; a cycle valve for controlling the system's cycle of operation, said valve controls being housed within said manifold; said pilot program cam mounted within said manifold to operate said pilot valve mechanism, which pilot valve mechanism controls said timer valve and said cycle valve for determining the cycle of said piston; and mechanical means for limiting the travel of said piston.

4. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact and slidably mounted on said piston rod; a hollow cylindrical sleeve concentrically mounted within said piston rod forming a bearing surface on which said piston rod operates; a driving spindle slidably mounted within said piston rod and adapted to have a tool holder affixed thereto, said spindle being rotated by said driving means; valve control means within said manifold; mechanical means for controlling said valve means for determining the cycle of said piston; and mechanical means for limiting the travel of said piston.

5. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact and slidably mounted on said piston rod; a hollow cylindrical sleeve concentrically mounted within said piston rod forms a bearing surface on which said piston rod operates; a female splined shaft adapted to receive a male spline shaft member, having mounted on its outer end a tool holder; said male spline shaft and said female spline shaft being housed within said hollow cylindrical sleeve and driven by said driving means; valve control means within said manifold; mechanical means for controlling said valve control means for determining the cycle of said piston; and mechanical means for limiting the travel of said piston.

6. A fluid operated machine tool, comprising a driving means; a fluid operated pump operated by said driving means; a manifold housing said pump; a work cylinder having a fluid actuated piston disposed within said cylinder, said piston having an enlarged piston element at one end thereof and a cylindrical piston rod of reduced diameter extending from said enlarged piston element; a piston rod bushing in frictional contact and slidably mounted on said reduced piston rod; movement of said piston rod in one direction carrying said piston rod bushing to a stop position whereby fluid exhaust is limited and the speed of movement of said piston is substantially reduced from forward rapid traverse to forward feed, said piston being returned in the reverse direction upon completion of the feed step; fluid then being introduced between said enlarged piston element and said piston rod bushing to reposition said piston rod bushing on said reduced piston rod and set up said piston rod bushing for a successive step; a driving spindle slidably mounted within said piston rod and adapted to have a work tool affixed thereto, said spindle being rotated by said driving means; valve control means within said manifold; mechanical means for controlling said valve control means for determining the cycle of said piston; and mechanical means for limiting the travel of said piston.

7. A fluid operated machine tool, comprising a driving means; a fluid operated pump operated by said driving means; a manifold housing said pump; a work cylinder having a fluid actuated piston disposed within said cylinder, said piston having a piston rod thereon; a piston rod bushing in frictional contact and slidably mounted on said piston rod; a hollow cylindrical sleeve concentrically mounted within said piston rod forming a bearing surface on which said piston rod operates; a female splined shaft adapted to receive a male spline shaft member having mounted on its outer end a tool holder; said male spline shaft and said female splined shaft being housed within said hollow cylindrical sleeve and driven by said driving means; a cam actuated pilot valve mechanism for controlling the system's program; a timer valve for controlling the time cycle of the program; a cycle valve for controlling the system's cycle of operation, said valve controls being housed within said manifold; said cam mounted within said manifold to operate said pilot valve mechanism, which pilot valve mechanism controls said timer valve and said cycle valve for determining the cycle of said piston; said fluid operated machine tool mechanism being enclosed in a unit housing; adjustable dogs being mounted on said housing of said machine tool; a movable flipper mounted on a control rod, secured to the head of said work cylinder piston, said control rod being housed in a hollow program shaft, said hollow program shaft being secured to said pilot valve program cam; said elements being so constructed and arranged that when said work cylinder piston moves forward, said movable flipper mounted on said control rod extends through and slidably engages a longitudinal slot in said hollow program shaft; said movable flipper working within said longitudinal slot, strikes said adjustable dogs, causing a rotation of said pilot valve program cam, said rotational movement causing a re-cycling of said machine tool.

8. A fluid operated machine tool, comprising a driving means; a fluid operated pump operated by said driving means; a manifold housing said pump; a work cylinder having a fluid actuated piston disposed within said cylinder, said piston having an enlarged piston element at one end thereof and a piston rod of a reduced diameter extending from said enlarged piston element; a piston rod bushing in frictional contact and slidably mounted on said reduced piston rod, movement of said piston rod in one direction carrying the piston rod bushing to a stop position whereby fluid exhaust is limited and the speed of movement of the piston is substantially reduced from forward rapid traverse to forward feed, said piston being returned in the reverse direction upon completion of the feed step; fluid is then introduced between said enlarged piston element and the piston rod bushing to reposition the piston rod bushing on said reduced piston rod and set up the piston rod bushing for the next successive feed step; a hollow cylindrical sleeve concentrically mounted within said piston rod forms a bearing surface on which said piston rod operates; a female splined shaft adapted to receive a male spline member, having mounted on its outer end a tool holder; said male spline shaft and said female spline shaft being housed within said hollow cylindrical sleeve driven by said driving means; said spindle being telescopically housed within said work cylinder piston rod and concentric therewith; a cam actuated pilot valve mechanism for controlling the system's program; a timer valve for controlling the time cycle of the program; a cycle valve for controlling the system's cycle of operation, said control valves being housed within said manifold; said cam mounted within said manifold to operate said pilot valve mechanism, which pilot valve mechanism controls said timer valve and said cycle valve for determining the cycle of said piston; said machine tool mechanism being enclosed in a unit housing; adjustable dogs mounted on said housing of said machine tool; a movable flipper mounted on a control rod secured to the head of said work cylinder piston, said control rod being housed in a hollow program shaft; said hollow program shaft being secured to said pilot valve program cam; said elements being so constructed and arranged that when said work cylinder piston moves forward, said movable flipper mounted on said control rod extends through and slidably engages a longitudinal slot in said hollow program shaft and strikes said adjustable dogs, causing a rotation of said pilot valve program cam; said rotational movement causing a recycling of said machine tool.

9. A fluid operated machine tool, comprising driving means; a fluid operated pump operated by said driving means; a manifold housing said pump; a work cylinder having a fluid actuated piston disposed within said cylinder, said piston having an enlarged piston element at one end thereof and a cylindrical piston rod of reduced diameter extending from said enlarged piston element; said enlarged piston element having a cup-shape configuration on the outer end thereof to provide a cushion of hydraulic fluid and retard the rapid return of said piston on completion of a work cycle; a piston rod bushing in frictional contact and slidably mounted on said piston rod; movement of said piston rod in one direction carrying said piston rod bushing to a stop position whereby fluid exhaust is limited and the speed of movement of said piston is substantially reduced from forward rapid traverse to forward feed, said piston being returned in the reverse direction upon completion of the feed step, fluid then being introduced between said enlarged piston element and said piston rod bushing to reposition said piston rod bushing on said reduced piston rod and set up said piston rod bushing for a successive step; a driving spindle slidably mounted within said piston rod and adapted to have a work tool affixed thereto, said spindle being rotated by said driving means; valve control means within said manifold; mechanical means for controlling said valve control means for determining the cycle of said piston; and mechanical means for limiting the travel of said piston.

References Cited in the file of this patent

UNITED STATES PATENTS

| | | |
|---|---|---|
| 2,233,571 | Alden | Mar. 4, 1941 |
| 2,633,709 | Dales | Apr. 7, 1953 |
| 2,647,407 | Hirvonen | Aug. 4, 1953 |